United States Patent [19]
Gunkel

[11] Patent Number: 6,146,610
[45] Date of Patent: Nov. 14, 2000

[54] PROCESS FOR REMOVAL OF ARSENIC FROM ELEMENTAL PHOSPHORUS

[75] Inventor: Louis T. Gunkel, Yardley, Pa.

[73] Assignee: FMC Corporation, Philadelphia, Pa.

[21] Appl. No.: 09/196,881

[22] Filed: Nov. 20, 1998

Related U.S. Application Data

[60] Provisional application No. 60/088,085, Jun. 5, 1998.

[51] Int. Cl.$^7$ .................................................. C01B 25/04
[52] U.S. Cl. ............................................................. 423/322
[58] Field of Search ............................................ 423/322

[56] References Cited

U.S. PATENT DOCUMENTS

| | | |
|---|---|---|
| 3,645,789 | 2/1972 | Mandelkow et al. . |
| 4,102,976 | 7/1978 | Hiemeleers et al. . |
| 5,567,474 | 10/1996 | Dover et al. . |
| 5,567,774 | 10/1996 | Schwindeman et al. . |
| 5,989,509 | 11/1999 | Gunkel et al. ............................ 423/322 |

FOREIGN PATENT DOCUMENTS

| | | |
|---|---|---|
| 88101536 | 9/1989 | China . |
| 1143794 | 2/1963 | Germany . |
| 73-05437 | 2/1973 | Japan . |
| 74-95891 | 9/1974 | Japan . |
| 54-93692 | 7/1979 | Japan . |
| 4-214796 | 7/1992 | Japan . |
| 4349111 | 12/1992 | Japan . |
| 5-43210 | 2/1993 | Japan . |
| 5-116916 | 5/1993 | Japan . |
| 06040710 | 2/1994 | Japan . |
| 6-40710 | 2/1994 | Japan . |
| 2048550 | 11/1995 | Russian Federation . |
| 763261 | 9/1980 | U.S.S.R. . |
| 919989 | 4/1982 | U.S.S.R. . |
| 1648899 A1 | 5/1991 | U.S.S.R. . |
| 1754651 A1 | 8/1992 | U.S.S.R. . |
| 1788948 A3 | 1/1993 | U.S.S.R. . |
| 981420 | 1/1965 | United Kingdom . |
| 1176773 | 1/1970 | United Kingdom . |

OTHER PUBLICATIONS

Liebhafsky, H. A., "Reactions Involving Hydrogen Peroxide, Iodine and Iodate Ion. IV. The Oxidation of Iodine to Iodate Ion by Hydrogen Peroxide," JACS, vol. 53, pp. 2074–2090, Jun. 8, 1931.

Liebhafsky, H. A. and Wu, L.S., Reactions Involving Hydrogen Peroxide, Iodine, and Iodate Ion. V. Introduction to the Oscillatory Decomposition of Hydrogen Peroxide, JACS, vol. 96, No. 23, pp. 7180–7187, Nov. 13, 1974.

Bray, W. C. and Caulkins, A. L., "Reactions Involving Hydrogen Peroxide, Iodine, and Iodate Ion. II. The Preparation of Iodic Acid, Preliminary Rate Measurements," JACS, vol. 53, pp. 44–48, Jan. 12, 1931.

Bray, W.C., A Periodic Reaction in Homogeneous Solution and Its Relation to Catalysis, JACS, vol. 43, No. 6, pp. 1262–1267, Jun. 1921.

Bugenov, E.S., "Impurity Removal from Technical Yellow Phosphorus," Russian Technical Paper, Apr. 2, 1987.

Astakhova, G. V.; Bokareva, S.I.; Talanov, N. D.; and Nisellson, LA., "Purification of Elementary Phosphorus by Fractional Distillation," Zh. Prikl. Khim. (Leningrad) 1973, 4614), 761–4. (English Abstract Only) (No month).

Osumi, Y.; Ishii, F.; Nakane, M.; and Miyake, Y., (Gov. Ind. Res. Inst., Osaka, Japan) "The Preparation of High–Purity Phosphorus. I. Removal of Trace Amounts of Arsenic from Phsophorus," Kogyo Kagahu Zasshi, 68(5); 920–6 (1965) (Japan). (English Abstract Only) (no month).

*Primary Examiner*—Wayne Langel
*Attorney, Agent, or Firm*—Polly E. Ramstad; Bruce M. Monroe; Patrick C. Baker

[57] ABSTRACT

Arsenic is removed from elemental phosphorus by treating it with an oxidized form of iodine in a sufficient amount and for a sufficient time to obtain the amount of arsenic reduction desired. When iodine is the source of the oxidized iodine an oxidant is additionally used. An oxidant is optionally used when an oxidized iodine is used. The oxidant also reduces the amount of antimony present in the elemental phosphorus, and a dilute oxidant rinse removes any residual iodine source and also results in a water-white liquid phosphorus.

28 Claims, 1 Drawing Sheet

FIGURE 1

PROCESS FOR REMOVAL OF ARSENIC FROM ELEMENTAL PHOSPHORUS

This appln claims the benefit of U.S. Provisional No. 60/088,085, filed Jun. 5, 1998.

FIELD OF THE INVENTION

The present invention relates to the extraction of arsenic and optionally antimony from ordinary elemental phosphorus (the allotrope having a melting point of about 44.1° C. and a boiling point of about 280.5° C.), also called white phosphorus, yellow phosphorus or $P_4$ phosphorus, by the use of an oxidized form of iodine.

BACKGROUND OF THE INVENTION

Elemental phosphorus can contain various heavy metals such as iron, arsenic, chromium, zinc and antimony at parts per million level. The amount of these contaminants present in the phosphorus is dependent upon the source of the phosphate ore from which the phosphorus is made and to some extent, the process used to refine the phosphorus, particularly the calcining of the phosphate ore prior to its entry into a furnace. For example, the levels of arsenic in white phosphorus can vary from 20 to about 220 parts per million (ppm) and antimony can range, for example, from 5 to about 70 ppm. The reduction of heavy metals in the phosphorus is desirable from an environmental viewpoint and it also can broaden the uses made of the phosphorus. For example, generally for food grade phosphoric acid both arsenic and antimony are preferably present at less than about 1 ppm. And for phosphoric acid used to make semiconductors or for other electronic uses, generally the arsenic is at less than about 50 parts per billion (ppb).

The literature provides many approaches to the removal of arsenic from elemental phosphorus. One approach is to wash elemental phosphorus with strong oxidants such as nitric or sulfuric acids or combinations of both, unexamined Japanese Patent application S52-160060(1979). This method is not desirable because of the large phosphorus loss, in the range of 20–50 percent due to oxidation by the acids, and large amounts of acid waste product which needs disposal. Distillation is another method of obtaining phosphorus with low arsenic levels, see for example, U.S. Pat. No. 4,483,746. Distillation is capital and labor intensive and also leaves a distillation residue product that is much higher in arsenic and other heavy metals due to the concentration caused by the distillation.

The disadvantages of washing elemental phosphorus with strong oxidants, or distillation or the formation of metal alloys is a premise for the addition of iodine or an iodine compound to phosphorus at 300° C. or less to form arsenic iodide ($AsI_3$) which has a much higher boiling point than phosphorus, as taught in unexamined Japanese Patent application HEI5(1993)43,210. This method enables the recovery of a larger portion of phosphorus due to the difference in boiling points and thus easier separation of phosphorus and the arsenic iodide. Although the distillation apparatus can be smaller and less expensive than that required to simply distill phosphorus, the process still has phosphorus losses in the distillation residue which also contains all of the removed arsenic and the iodine. Another disadvantage is the iodine must be added in great excess (about 10,000 times the stoichiometric levels).

Another approach to the avoidance of the various disadvantages of conventional processes for the removal of arsenic from phosphorus is the basis for unexamined Japanese Patent application H4(1994)-214796. The application discloses the use of iodine oxides, iodates, periodates and sodium hypoiodate as agents to treat phosphorus at 44–300° C. to reduce arsenic levels. The arsenic is oxidized by the iodine compounds and becomes arsenous oxide making a distillation separation of the phosphorus and arsenic easier. The process still requires distillation, the use of 1,000 times the stoichiometric metric amount of iodine needed to react with the arsenic present and the yields varied from about 60–83 percent.

The iodate process of the present invention provides a cost effective means with a high yield (about 98 percent and better) of phosphorus to reduce the level of arsenic to less than about 5 ppm, and optionally the level of antimony (less than about 0.02 ppm) in elemental phosphorus. The arsenic and antimony are extracted and recovered in an aqueous phase. Any traces of iodine remaining with the phosphorus can be readily removed by washing the phosphorus with dilute hydrogen peroxide or other oxidant. The aqueous phase can be treated with known methods to remove the arsenic and antimony. Thus, the process of the present invention avoids a residue of arsenic (and antimony) in combination with phosphorus.

BRIEF DESCRIPTION OF THE DRAWING

One means of conducting the process in a closed laboratory reactor is shown in the drawing. A three-necked reactor flask 1 is charged with chemicals, leaving a small vapor space 2 for expansion and is then sealed and immersed in a water bath 3 operating at about 50–80° C. Sealing of the flask prevents the iodine from evaporating out of the system. Being immersed in the water bath keeps the reactor warm and prevents iodine from condensing on a cool surface. In a commercial operation, the reactor may preferably be designed to operate under a small positive pressure of about 1 to 10 pounds per square inch. The phosphorus phase 4 comprises elemental phosphorus covered with water. The aqueous extraction solution 5 containing iodine (or an iodate) and an oxidant, such as hydrogen peroxide, is added to the reactor flask. The stirrer 6 is placed preferably as near the bottom of the reactor as possible. Although a paddle stirrer is shown in the drawing, this type stirrer is not critical and others which allow for the mixing of the reaction system may be used. The phosphorus and aqueous are mixed for a sufficient time to allow the iodate to react with the arsenic in the phosphorus.

DESCRIPTION OF THE INVENTION

Arsenic and antimony levels in elemental phosphorus are significantly reduced by contacting phosphorus containing arsenic with an aqueous solution of an oxidized form of iodine. This oxidized form can be as an iodate, iodic acid, produced by the reaction of iodine with an oxidant and mixtures thereof. In the case of iodine and oxidant, their order of addition is not critical. They can be added together or separately to form the aqueous solution which contacts the phosphorus. Optionally, an oxidant can be added when an oxidized iodine is used. Although an oxidant is not needed when using an oxidized iodine to extract arsenic, an oxidant's presence is not detrimental. In some instances the presence of oxidant is preferred as it can make the separation more effective between the phosphorus phase and the arsenic-containing aqueous phase, and it can aid in the removal of residual iodine from the phosphorus. It is believed the oxidant in the presence of the oxidized iodine, e.g., iodate, converts arsenic iodide to arsenious acid which is more water soluble, enhancing separation of the phosphorus from the aqueous phase, and resolubilizing iodine produced from the iodate.

Throughout the specification and claims:

(a) The amount of oxidized form of iodine is expressed as weight percent iodine ($I_2$) based on weight of phosphorus.

(b) The amount of oxidant used is based on weight percent of an active oxygen based on the weight of phosphorus. Thus, 7 weight percent active oxygen in the instance of the oxidant hydrogen peroxide means 15 weight percent of $H_2O_2$ based on the weight of phosphorus (7 multiplied by the molecular weight of hydrogen peroxide/molecular weight of oxygen equals about 15).

(c) The amounts of iodine and oxidant are expressed in weight percent amounts based on the weight of phosphorus containing about 140–160 ppm arsenic and about 40–50 ppm antimony. If phosphorus being treated by the process of this invention contains a greater or lesser amount of arsenic or antimony, then the amount of oxidized iodine and oxidant, respectively, may need to be adjusted which can be readily done by one knowledgeable in the art.

In the process of the present invention, the iodine is added in an amount to remove the desired amount of arsenic from the elemental phosphorus. By varying the amount of the oxidized form of iodine, the amount of arsenic removed can be controlled. In an open (to the atmosphere) system, where the phosphorus contains about 140–160 ppm arsenic, amounts of iodine ($I_2$) exceeding about 7 weight percent based on the weight of the phosphorus will not effect any greater arsenic removal as the arsenic level is below 5 ppm. Depending upon the loss of iodine from an open reactor system, the amount of iodine ($I_2$) preferably does not exceed about 5 and more preferably does not exceed about 3 wt/wt percent iodine (to obtain less than about 5 ppm arsenic). The actual amount of the iodine used is dependent upon the degree of arsenic reduction desired. (If an iodate compound is used, the amount is increased appropriately. As an example, about 1.6 grams of sodium iodate is equivalent to 1.0 gram of iodine.) When a closed or sealed (to the atmosphere) reactor is used and the phosphorus contains 140–160 ppm arsenic, then the amount of iodine can be reduced to about 1 wt/wt percent or less (compared to about 7 w/wt percent used in an open system) to achieve less than about 5 ppm arsenic in the elemental phosphorus to reduce the arsenic to less than about 5 ppm (0–5).

Forms of iodine which may be used in the process include $I_2$, iodic acid ($HIO_3$) and iodates including sodium ($NaIO3$), potassium iodate ($KIO_3$), and calcium iodate ($Ca(IO_3)_2$).

When iodine ($I_2$) is used to treat the elemental phosphorus to remove arsenic an oxidant is also used. The oxidant converts the water-insoluble $I_2$ to a more water soluble iodate which is more effective in removing the arsenic. Although not needed, the addition of an oxidant benefits the use of iodic acid or iodate salts as the oxidant is believed to convert the arsenic iodide and $I_2$ which forms into a more water-soluble form of arsenious acid (arsenous acid). The presence of an oxidant readily removes antimony from the elemental phosphorus. A final washing of the phosphorus with a dilute oxidant solution will remove any remaining iodine as well as lightening the color of the phosphorus and providing a clearer product, presumably by reacting with insoluble organics that are present to a small extent in the phosphorus. The clear or water-white liquid phosphorus is desired by phosphorus purchasers.

Examples of oxidants useful in the present invention include peroxy compounds such as hydrogen peroxide, peroxydisulfate, peroxymonosulfate, and hypochlorous acid or its salt sodium hypochlorite, and mixtures of oxidants. Peroxydisulfate, $S_2O_8$, is available as the alkali, alkaline earth, and ammonium salt. Peroxymonosulfate, $SO_5^{-2}$ is available in the acid form, as Caro's acid, $H_2SO_5$ and is also available under the DuPont trademark, Oxone in the form of the salt $2KHSO_5$ $KHSO_4K_2SO_4$.

When iodine ($I_2$) is used as the source of the oxidized form of iodine, the oxidant is used in an amount sufficient to oxidize the iodine to an iodate. Because the oxidant has no (or very minimal) effect on the removal of arsenic, there is a minimal amount of oxidant that will maximize the arsenic removal for a fixed amount of iodine. Generally, there is no additional benefit obtained by using more than about 7.5 wt/wt percent oxidant based on active oxygen when about 7 wt/wt percent iodine is used (open reactor system) or by using more than about 5 wt/wt percent oxidant based on active oxygen when about 1 wt/wt percent iodine is used (closed reactor system). It would be apparent to one in the art, and as the examples show, there is some latitude in varying the amounts of oxidant and iodine ($I_2$) to obtain the degree of arsenic reduction required and effect cost. When an oxidant is used with an oxidized iodine, then the amount of oxidant is less critical and a dilute solution of the oxidant will suffice, generally from about 0.05–1.14 and preferably 0.1–1 wt/wt percent oxidant (as active oxygen).

When it is desired to reduce the antimony content of the phosphorus, then an oxidant is used in an amount of from about 0.05–2.4, preferably 0.1–1 and more preferably 0.24–0.5 wt/wt percent active oxygen based on weight of phosphorus. This is in addition to the oxidant needed to convert iodine ($I_2$) to the oxidized form of iodine.

Finally, when it is desired to remove residual iodine from the treated phosphorus, then the phosphorus is washed with a diluted oxidant solution. The oxidant is generally used in an amount of 0.05–1.14, preferably 0.1–1 and more preferably 0.24–0.5 wt/wt percent oxidant (as active oxygen).

In all instances where oxidant is used, it is generally desirable to use it in excess to facilitate the rate of reaction and to enhance the probability of its contact with the iodine, antimony and the phosphorus phase.

Elemental phosphorus has many allotropic forms. The phosphorus of this invention, commonly termed "elemental phosphorus" has a melting point of about 44.1° C. and a boiling point of about 280.5° C. Such phosphorus is sometimes called white phosphorus in the text books because that is the color of the purified element. But, in the industry, it is commonly called yellow phosphorus, as that is, typically, the color of the industrially pure form.

Figure 1:
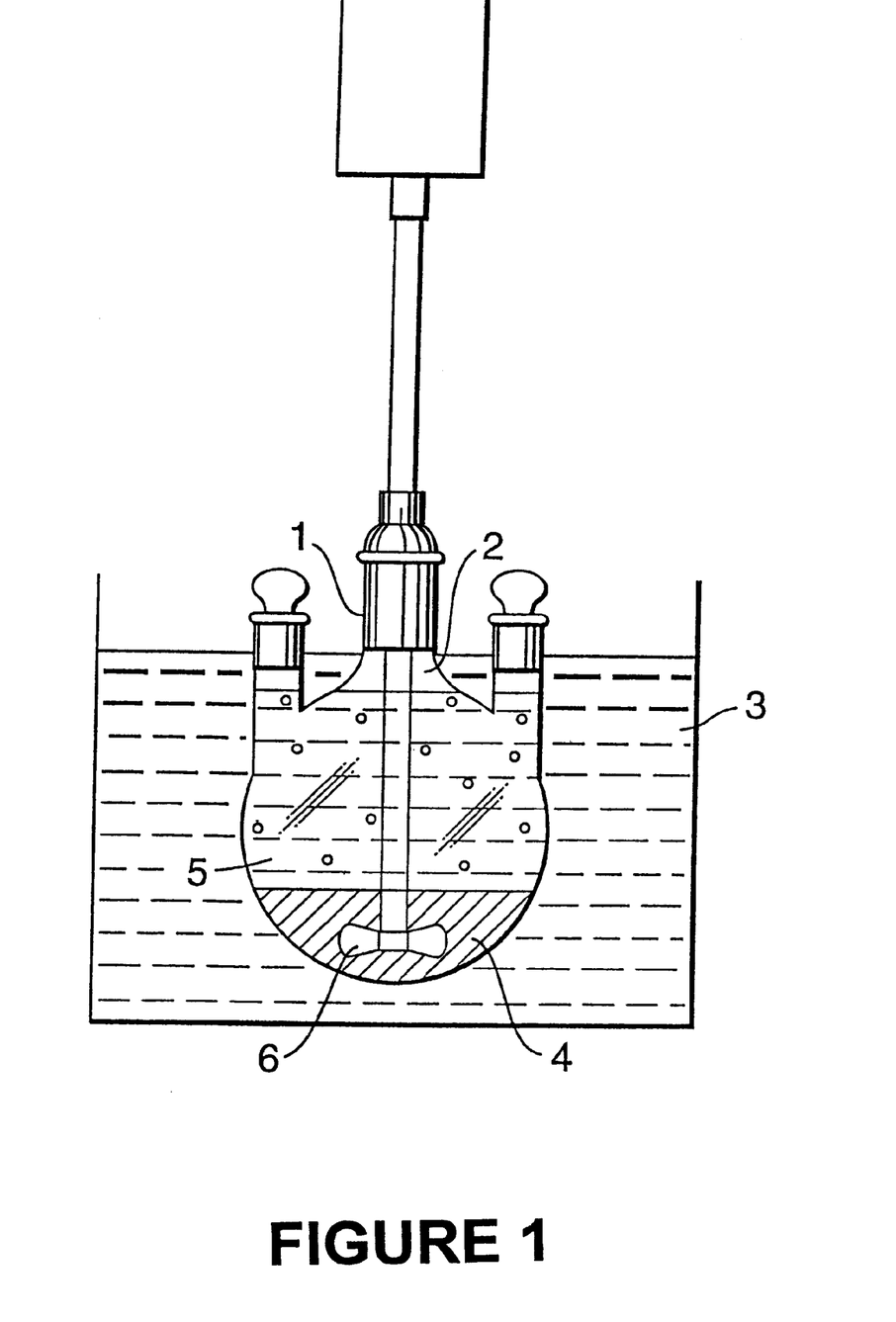

Because elemental phosphorus reacts spontaneously with oxygen, its contact with air is avoided when recovering it from an ore or when treating it in accordance with the method of this invention. Thus, the phosphorus can be kept in a vacuum or under an inert gas blanket or more commonly under a water blanket. Because water is immiscible with and less dense than phosphorus, water forms, in a quiescent state, a protective aqueous layer above the phosphorus serving as an effective, economical interface that precludes phosphorus contact with air. An example of a water-blanketed laboratory reactor is given in the drawing. It is to be understood that the present invention is conducted in a manner which avoids the contact of phosphorous with air or oxygen. Any reactor which allows for that and is suitable for mixing can be used, e.g., a tank reactor or Pfaudler reactor.

Arsenic and antimony are intimately associated with the elemental phosphorus in the phosphorus phase. Although the exact manner in which arsenic or antimony is bound to the phosphorus is unknown, it is connected in a manner that prevents the separation of the arsenic and antimony and the phosphorus through mere water extraction or filtration. When water is used to blanket the phosphorus, the iodine source and oxidant are added to the aqueous phase. The likelihood of an effective contact between the hydrogen peroxide and the antimony containing phosphorus is, thus, extremely low, absent some other factor.

Steps can be taken to increase the likelihood of effective contact. One of these is to increase the level of agitation of the phosphorus system as much as possible to improve the degree of contact between the phosphorus and the iodine and oxidant, while limiting the degree of agitation sufficiently to avoid having the phosphorus come in contact with, and reacting with, air.

As a rule, slow or poor mixing will prolong the time needed to remove the arsenic and antimony. Optimum mixing as defined by safe engineering practices will decrease the time needed for the process to take effect and overly vigorous mixing will cause emulsions, sludge, and separation problems between the phosphorus and the aqueous phase containing the oxidants, iodine, arsenic (and antimony). Such mixing optimizes interfacial contact of the phosphorus and water phases to facilitate the purification process. Any device that generates sufficient agitation to mix the aqueous and phosphorus phases can be used: stirrers, mixers, a combination of baffles and circulating pumps, or other agitating devices that do not create an undue risk of bringing the phosphorus into contact with air. Preferably, the aqueous hydrogen peroxide or other oxidants are brought into intimate contact with the arsenic containing phosphorus through judicious vigorous mixing or agitating. The term "agitating" is used to connote an intermixing of the phases that occurs within these guidelines.

Controlling the temperature of the phosphorus system is important during the purification process, since the purification cannot proceed efficiently with solid phosphorus as only the surface arsenic and antimony will be affected. Thus, the temperature is preferentially kept above 44.1° C., the melting temperature of phosphorus. In an open reactor system, the boiling point of water must not be exceeded. Otherwise, the phosphorus can contact air. In a closed reactor system, the temperature can be as high as desired. At temperatures exceeding 100° C., there will be an increase in pressure so at those temperatures a high pressure closed reactor system needs to be used. Given these constraints, a reasonable mixing temperature is within the range of from about 45–95° C. while operating at atmospheric pressure. However, when an open reactor is used, the preferred operating temperature range is 50–70° C. and the more preferred range is 50–60° C. When a non-high pressure, closed reactor system is used, the preferred operating range is about 60–95° C., and more preferred is 65–75° C.

The length of time needed to remove the arsenic and optionally antimony from a portion of phosphorus is dependent upon the concentration of the iodine source and the oxidant in the water phase, the temperature of the system, and the degree of mixing that the phosphorus and the aqueous phase containing the iodine source and oxidant are subjected to and the reactor system and setup. The better the mixing or contact between the phosphorus and the iodine and oxidant in the aqueous phase, the quicker the process will work to cause the arsenic and antimony to transfer into the aqueous phase. Therefore, the best mixing consistent with good chemical engineering practices is recommended. Under laboratory conditions and a batch process, a time of from 1–3 hours was sufficient. A continuous system, using two reactors and bubbling the oxidized form of iodine and oxidants through the phosphorus is expected to require less time than a batch system.

The examples provided herein demonstrate that it is possible to reduce arsenic levels in elemental phosphorus from 200 ppm to less than 1 ppm and to reduce antimony levels in elemental phosphorus from 40–50 ppm or higher to less Man the about 1 ppm by this process in a reasonable time period with proper mixing.

Notably, very little phosphorus is consumed in the process. Under the conditions described herein, typical recovery rates for the phosphorus are greater than 98%. Generally, rates lower than 98% were due to factors such as experimental error or not taking into account carryover into the aqueous phase.

Except for the oxidant consumed during the purification process, very little oxidant or iodine appears to be consumed by the closed reactor process. Since oxidizer usage during the process appears stoichiometric, based on the analyses of the aqueous phase during a three hour extraction period, the oxidant solutions can be reused with only a small make-up of oxidant or iodine being necessary until the build-up of arsenic and antimony in the aqueous phase becomes high enough to significantly affect the separation. By routine testing for peroxygen, iodine, arsenic and antimony, schedules can be established for replenishing the water used for the aqueous phase.

EXAMPLES

Description of the Extraction Process

Unless otherwise indicated, the examples used the following extraction or treatment of the phosphorus. 100–150 milliliters of water were poured into a 300 ml tall-form beaker. The beaker was set it in a water bath set at 60° C. and a stirrer was set in place as close to the bottom of the beaker as possible without touching the bottom. When the water temperature reached 60° C., 30–40 grams of phosphorus were added. The phosphorus quickly melted (44.2° C.) and a two phase system resulted with the water being the top phase. After the phosphorus melted, the stirrer was started at a speed of 300 rpm. The desired amount of oxidant and iodine (or iodate) was then added to the aqueous phase. The order of addition of the iodine or iodate and oxidant is not critical and either can be added first, followed by the other or both compounds can be added together. Following a prescribed mixing period (1–5 hours), for the system, the stirrer was stopped and withdrawn from the beaker. The length of mixing time is determined by the degree of mixing that is possible with the stirrer used. Mixing that provides good contact between the phosphorus and aqueous solution will cause the treatment to be accomplished in a shorter time. If the mixing is too vigorous, the phosphorus may rise to the top of the aqueous layer and react with oxygen in the air and begin to burn. It is important to keep the mixing such that there is always a layer of water above the phosphorus unless the mixing is done in an inert atmosphere. When the mixing ceased, the $P_4$ and the aqueous phases separated sharply. The beaker was then taken from the 60° C. bath and cooled in an ice bath to freeze the phosphorus phase (20–30° C.). The extractant solution was then quickly poured off and 100 milliliters of de-ionized water was quickly added back to the beaker containing the phosphorus.

The phosphorus and aqueous phases were then analyzed for arsenic, antimony and other heavy metals. The aqueous phase was sometimes analyzed for phosphorus to determine the phosphorus losses over the test period.

Residual iodine was removed from the phosphorus by washing it with dilute solutions of hydrogen peroxide (0.5–3 wt/wt %) until the phosphorus product was water white.

In all of the examples, unless otherwise indicated, all the percentages are weight/weight and "n.a." means "not applicable."

Hydrogen peroxide followed by iodine treatment

Example 1

Using the procedure described above, 100 milliliters of water was charged to a 300 milliliter beaker and heated to 60° C. To the water was then added 43.1 grams of elemental phosphorus. The phosphorus promptly melted and fell to the bottom of the beaker. The stirrer was then started at 300 rpm and 40 grams of 10.9 wt/wt % hydrogen peroxide solution were added to the water phase of the mixture. ($H_2O_2$ strength ~3.1 % in beaker). The mixture was stirred for three hours at temperature after which the phosphorus was sampled with a syringe and analyzed.

|  | Arsenic | Antimony |
|---|---|---|
| $P_4$, Analysis Initially | 200 ppm | 47 ppm |
| $P_4$, After 3 Hours | 195 ppm | <0.2 ppm |

After taking the sample, 0.1 grams of elemental iodine were added to the aqueous layer of the reaction mixture. This mixture was stirred for an additional 90 minutes after which time the stirrer was withdrawn from the beaker and the $P_4$ was frozen in an ice bath. The aqueous phase was poured off and 100 milliliters of fresh de-ionized water was added to the beaker. The treated phosphorus was then analyzed.

|  | Arsenic | Antimony |
|---|---|---|
| $P_4$, After $I_2$ Addition | 120 ppm | <0.02 ppm |

The addition of a small amount of iodine reduces the arsenic. The antimony has been almost completely removed.

Example 2

Using the apparatus described above, 100 milliliters of water were charged to a 300 milliliter beaker and heated to 60° C. To the water was then added 30.57 grams of elemental phosphorus. The phosphorus promptly melted and fell to the bottom of the beaker. The stirrer was then started at 300 rpm and 6.0 grams of 30 wt/wt % hydrogen peroxide solution were added to the water phase of the mixture. ($H_2O_2$ strength ~1.8 % in beaker) and 0.6 grams of elemental iodine. The mixture was stirred for three hours at temperature and then the phosphorus and the aqueous phases were sampled and analyzed. The phosphorus recovered weighed 29.19 grams and the aqueous phase weighed 80.74 grams. The analysis of the two phases was:

TABLE 1

| Phase | Arsenic | Antimony | Phosphorus |
|---|---|---|---|
| $P_4$, Analysis, Initial | 160 ppm | 37 ppm | n.a. |
| $P_4$, After 3 Hours | 43 ppm | <0.2 ppm | n.a. |
| Aqueous Solution | 40 ppm | 13 ppm | 0.43% |

In this case over 73 percent of the arsenic was removed from the phosphorus by the treatment with 6 percent hydrogen peroxide and 2 percent iodine based on the phosphorus charge.

Based on the analysis of the phosphorus and the aqueous phases, over 90 percent of the arsenic and antimony that were removed from the phosphorus were accounted for in the aqueous phase. Phosphorus recovery after treatment, based on the analysis of phosphorus in the aqueous phase, was 99 percent.

Example 3

Using the apparatus described above, 100 milliliters of water were charged to a 300 milliliter tall form beaker and heated to 60° C. To the water was then added 25.84 grams of elemental phosphorus. The phosphorus melted and fell to the bottom of the beaker. Ten grams of 10% hydrogen peroxide solution and 0.41 grams of elemental iodine were added to the water phase of the mixture. ($H_2O_2$ strength ~1.0 % in beaker.) The mixture was stirred for three hours at temperature and then the phosphorus and the aqueous phase were sampled and analyzed. The phosphorus recovered weighed 25.80 grams and the aqueous phase weighed 100.2 grams. The analysis of the two phases was:

TABLE 2

| Phase | Arsenic | Antimony | Phosphorus |
|---|---|---|---|
| $P_4$, Analysis, Initial | 200 ppm | 42 ppm | n.a. |
| $P_4$, After 3 Hours | 77 ppm | <0.2 ppm | n.a. |
| Aqueous Solution | 31 ppm | 12 ppm | 0.15% |

In this case over 60 percent of the arsenic was removed from the phosphorus by treatment with 3.9 percent hydrogen peroxide and 1.6 percent iodine based on the phosphorus charge.

Based on the analysis of the phosphorus and the aqueous phase, over 97 percent of the arsenic and antimony that were removed from the phosphorus were accounted for in the aqueous phase. Phosphorus recovery after treatment, based on the analysis of phosphorus in the aqueous phase, was 99.4 percent.

Following the treatment, the phosphorus had a reddish hue indicating there was some residual iodine present. The phosphorus was washed with 100 grams of a two percent hydrogen peroxide solution. The phosphorus became water white and very clear after the wash and x-ray defraction analysis (XRD) analysis of the phosphorus showed less than 5 ppm of iodine present.

Example 4

In this set of samples, the iodine level was kept constant and the peroxide level was varied in the treatment solution. In this system there was a minimum concentration of hydrogen peroxide required to maximize the arsenic removal for a fixed amount of iodine, and the iodine was the controlling operator in removing arsenic from the system. In this set of samples the removal of arsenic leveled off after the fifth run and adding additional peroxide did not further reduce the arsenic in the phosphorus.

TABLE 3

| $P_4$ gm | Iodine gm | % $I_2$ per $P_4$ | 10% $H_2O_2$ gm | $H_2O$ gm | % $H_2O_2$ per $P_4$ | As ppm | Sb ppm |
|---|---|---|---|---|---|---|---|
| 30 | 1 | 3.3 | 0 | 150 | 0 | 180 | 20 |
| 30.23 | 1 | 3.31 | 15 | 135 | 4.96 | 29 | 0.2 |
| 30.9 | 1 | 3.24 | 30 | 120 | 9.71 | 19 | 0.2 |
| 30.45 | 1 | 3.28 | 30 | 120 | 9.85 | 13 | 0.2 |
| 30.8 | 1 | 3.25 | 45 | 105 | 14.61 | 5.6 | 0.2 |
| 31.29 | 1 | 3.2 | 60 | 90 | 19.18 | 5.5 | 0.2 |

Example 5

This set of samples demonstrates the effect of using a fixed amount of peroxide and varying the iodine level in the treatment solution. By varying the iodine concentration in the treating solution, the amount of arsenic that is removed from the phosphorus can be controlled. It appears that the antimony will be reduced to very low levels (<1 ppm) no matter what combination of iodine and hydrogen peroxide are used.

This data (Table 5) shows that with a hydrogen peroxide presence in the aqueous treating solution of from 1.0 to 14 percent based on the phosphorus being treated and an iodine concentration of from 0.25 to 6.0 percent based on the phosphorus being treated was removed.

TABLE 4

| $H_2O$ gm | 30% $H_2O_2$ gm | % $H_2O_2$ in $H_2O$ | Iodine gm | $P_4$ gm | % $H_2O_2$ per $P_4$ | % $I_2$ per $P_4$ | Final As in $P_4$ ppm | Final Sb in $P_4$ ppm |
|---|---|---|---|---|---|---|---|---|
| 100 | 15 | 4.5 | 0 | 30 | 15.00 | 0 | 190 | 0.2 |
| 100 | 15 | 4.5 | 0.10 | 29.00 | 15.52 | 0.34 | 100 | 0.2 |
| 100 | 15 | 4.5 | 0.20 | 31.45 | 14.31 | 0.64 | 85 | 0.2 |
| 100 | 15 | 4.5 | 0.30 | 31.40 | 14.33 | 0.96 | 34 | 0.1 |
| 100 | 15 | 4.5 | 0.50 | 32.40 | 13.89 | 1.54 | 15 | 0.1 |
| 100 | 15 | 4.5 | 0.80 | 30.16 | 14.92 | 2.65 | 18 | 0.1 |
| 100 | 15 | 4.5 | 1.00 | 30.49 | 14.76 | 3.28 | 4.1 | 0.1 |
| 100 | 15 | 4.5 | 1.50 | 30.00 | 15.00 | 5.00 | 1.2 | 0.1 |

Examples 6–8

The Use of Iodates to Remove Arsenic and Antimony from Phosphorus

The procedure for reducing arsenic and antimony from phosphorus using the solutions of iodate salts was similar to that used for the iodine (oxidant hydrogen peroxide) process. Typically a solution of an iodate salt in 150 grams of water was prepared. The strength of the iodate solution determines the amount of arsenic that is removed from the phosphorus. This solution was charged to a 300 ml beaker equipped with a Teflon coated mechanical stirrer and the beaker was placed in a 60° C. water bath. Thirty grams of phosphorus was then added to the beaker and quickly melted at 60° C. When the phosphorus melted, the mixture was stirred at 300 rpm in the open air. The mixing was not vigorous enough to bring the phosphorus to the surface of the water layer but rather folded the iodate solution into the phosphorus for contact. The mixing was carried on for three hours at the 60° C. When the stirrer stopped, the two phases quickly separated. The aqueous layer was removed by freezing the phosphorus at 20° C. and decanting the iodate solution away, replacing it with water. (Under plant conditions, it is not necessary to freeze the phosphorus to effect the separation, the phosphorus can be drained from the iodate solution through a bottom valve in the mixing vessel.)

The phosphorus phase contained less arsenic and antimony after the treatment than before, the amount reduction depended on the strength of the iodate solution. The aqueous iodate phase contained the arsenic and antimony that was removed from the phosphorus. The phosphorus can be washed with a dilute hydrogen peroxide solution to remove any traces of iodine which might remain after the treatment.

Example 6

Sodium Iodate

Using the equipment described at the beginning of the experimental section, 100 milliliters of water containing 3.0 grams of sodium iodate were charged to the beaker. Phosphorus in the amount of 30.7 grams was then added and the solution was heated to 60° C. The mixture was stirred for two hours after which it was cooled to 20° C. and the phases were separated. The phosphorus weighed 30.3 grams and the aqueous phase weighed 97.6 grams.

TABLE 5

| Phase | Arsenic | Antimony |
|---|---|---|
| $P_4$, Analysis, Initial | 160 ppm | 37 ppm |
| $P_4$, After 3 Hours | 1.8 ppm | <0.1 ppm |
| Aqueous Solution | 50 ppm | 11 ppm |

Based on the analysis of the phosphorus and the aqueous phases, over 99 percent of the arsenic and 94.5% of the antimony that were removed from the phosphorus was accounted for in the aqueous phase.

Following the treatment, the phosphorus had a reddish hue indicating there was some residual iodine present. The phosphorus was washed with 100 grams of a two percent hydrogen peroxide solution. The phosphorus became water white and very clear after the wash and XRD analysis of the phosphorus showed less than 5 ppm of iodine present.

Example 7

Sodium Iodate

Using the procedure described for Example 6, phosphorus was treated with a series of sodium iodate (iodine) concentrations from one percent up to six percent based on the amount of phosphorus that was treated. As the amount of sodium iodate (iodine) used to treat the phosphorus was increased, the arsenic level in the treated phosphorus went down until at six percent the arsenic level in the phosphorus is less than 2 ppm. See Table 6.

In addition, Table 6 shows that all of the arsenic and antimony removed from the phosphorus shows up in the aqueous treatment solutions (iodate and peroxide washes). All of these samples were washed with a dilute hydrogen peroxide solution to remove traces of iodine that might remain in the phosphorus and to provide a superior appearance to the phosphorus.

The recovery of the phosphorus through the total process was calculated in two ways as shown at the bottom of the table. One method was to compare the weight of the treated phosphorus with the weight of the starting phosphorus and the second and more reliable method was to calculate the loss of phosphorus to the aqueous phases based on a phosphorus analysis of these aqueous phases and calculate a recovery from that data. The Balances given in Table 6 compare the sum of the arsenic and antimony quantities in the extracted phosphorus and the extracting solution to the amount of arsenic and antimony originally present in the phosphorus. In all cases the phosphorus recovery through the process was very high.

TABLE 6

| Sample: | 7-1 | 7-2 | 7-3 | 7-4 | 7-5 |
|---|---|---|---|---|---|
| Starting $P_4$, gm | 29.94 | 31.87 | 31.16 | 30.79 | 30.7 |
| As, ppm | 160 | 160 | 160 | 160 | 160 |
| Sb, ppm | 42 | 42 | 42 | 42 | 42 |
| Water, gm | 100 | 100 | 100 | 100 | 100 |
| $NaIO_3$ gm | 0.5 | 1 | 1.5 | 2 | 3 |
| $I_2$ per $P_4$, wt/wt. % | 1.07 | 2.01 | 3.08 | 4.16 | 6.26 |
| Final $P_4$, gm | 29.4 | 30.59 | 29.63 | 30.93 | 29.78 |
| As, ppm | 120 | 86 | 37 | 17 | 1.8 |
| Sb, ppm | 0.1 | 0.1 | 0.1 | 0.1 | 0.1 |
| Iodate Wash Phase, gm | 65.26 | 89.88 | 106.73 | 96.87 | 97.01 |
| As, ppm | 19 | 30 | 41 | 43 | 50 |
| Sb, ppm | 20 | 15 | 14 | 11 | 11 |
| $P_{4, ppm}$ | 2000 | 2400 | 3100 | 4000 | 3500 |
| Peroxide Wash Phase, gm | 96.34 | 134.95 | 117.98 | 108.6 | 105.55 |
| As, ppm | 0.65 | 2 | 2.3 | 11 | 1.1 |
| Sb, ppm | 0.07 | 0.3 | 0.52 | 1.3 | 0.2 |

TABLE 6-continued

| Sample: | 7-1 | 7-2 | 7-3 | 7-4 | 7-5 |
|---|---|---|---|---|---|
| $P_{4, ppm}$ | 230 | 430 | 1400 | 6000 | 4000 |
| $P_4$ recovery by wt % | 98 | 96 | 95 | 100 | 97 |
| $P_4$ recovery by $P_4$ loss to Aqueous, % | 99.49 | 99.14 | 98.41 | 96.63 | 97.52 |
| Balances: What remains in the $P_4$ compared to what was removed, %: | | | | | |
| Arsenic | 101.82 | 91.57 | 88.91 | 105.77 | 100.17 |
| Antimony | 96.12 | 99.06 | 87.39 | 121.08 | 120.55 |

Example 8

Potassium Iodate

A series of samples in which potassium iodate was used as the iodine source for treatment is shown in Table 8. Again, as the amount of the iodate used in the treatment was increased, the amount of arsenic that was removed from the phosphorus increased. As the iodine percentage relative to the phosphorus treated approached six percent, it was close to removing all of the arsenic that was in the phosphorus.

TABLE 7

| Sample | Water gm | $P_4$ gm | $KIO_3$ gm | Iodine per $P_4$, % | Final As in $P_4$ ppm | Final Sb in $P_4$ ppm |
|---|---|---|---|---|---|---|
| 8-1 | 100 | 30.68 | 3.00 | 5.80 | 0.84 | 0.10 |
| 8-2 | 100 | 31.46 | 3.00 | 5.65 | 5.70 | 0.10 |
| 8-3 | 100 | 41.06 | 3.00 | 4.33 | 10.00 | — |
| 8-4 | 100 | 30.14 | 2.00 | 3.93 | 32.00 | 0.42 |
| 8-5 | 100 | 30.99 | 1.67 | 3.20 | 36.00 | 0.54 |
| 8-6 | 100 | 30.75 | 1.00 | 1.93 | 69.00 | 0.10 |
| 8-7 | 100 | 29.90 | 0.50 | 0.99 | 81.00 | 0.10 |
| 8-8 | 100 | 30.67 | 0.50 | 0.97 | 96.00 | — |
| 8-9 | 100 | 32.35 | 0.50 | 0.92 | 92.00 | — |
| 8-10 | 100 | 30.27 | 0.25 | 0.49 | 140.00 | — |
| 8-11 | 100 | 30.30 | 0.25 | 0.49 | 140.00 | — |
| 8-12 | 100 | 30 | 0 | 0.00 | 180.00 | — |

Additional samples which used potassium iodate to reduce the arsenic and antimony levels in phosphorus is shown in Table 8.

TABLE 8

| | | | | | | $P_4$ Phase | | | Aqueous Phase | | | | |
|---|---|---|---|---|---|---|---|---|---|---|---|---|---|
| Sample | $P_4$ gm | $H_2O$ gm | $KIO_3$ gm | % I per $P_4$ | Mixing, min | Final $P_4$ gm | As ppm | Sb ppm | $H_2O$, gm after test | As ppm | Sb ppm | % $P_4$ | $P_{4\ Loss}$ to $H_2O$, % | $H_2O_2$ Wash |
| 8-13 | 41.06 | 100 | 3 | 2.56 | 60 | 39.74 | 10 | 0.1 | 157.66 | | | 0.1 | 0.38 | 2.30% |
| 8-14 | 32.35 | 100 | 0.5 | 0.54 | 60 | 31.96 | 92 | 0.19 | 112 | 30 | 18 | 0.19 | 0.66 | 2.30% |
| 8-15 | 30.27 | 100 | 0.25 | 0.29 | 60 | 28.11 | 140 | 0.1 | 141.78 | 30 | 12 | 0.097 | 0.45 | 2.30% |
| 8-16 | 30.67 | 100 | 0.5 | 0.57 | 60 | 26.33 | 96 | 0.1 | 113.34 | 24 | 12 | 0.2 | 0.74 | 1.20% |
| 8-17 | 30.21 | 100 | 0.5 | 0.58 | 120 | 29.69 | 120 | 0.1 | 121.16 | 16 | 14 | 0.073 | 0.29 | 0.00% |
| 8-18 | 30.30 | 100 | 0.25 | 0.29 | 120 | 30.14 | 140 | 0.1 | 112.04 | 7.5 | 14 | 0.041 | 0.15 | 0.50% |

Example 9

Use of Other Oxidants in Combination with Iodine

A series of samples used oxidants other than hydrogen peroxide with elemental iodine to reduce arsenic in the phosphorus. Three different compounds were tried. The treatment was similar to that used for treating with the $I_2/H_2O_2$ system. Each system was run twice, once with just the oxidant and again with the oxidant plus elemental iodine. The charges listed below were added to a 300 ml beaker and stirred at 60° C. for several (three) hours. The phosphorus and aqueous phases were then separated and analyzed.

TABLE 9

| | $Na_2S_2O_8$ | $KSO_5$ | NaOCl |
|---|---|---|---|
| $P_4$ Charge | 30 grams | 30 grams | 29.6 grams |
| Water | 150 grams | 150 grams | (with Hypo) |
| Oxidant | 20 grams | 54 grams | 250 grams |
| Iodine | 1 or 0 grams | 1 or 0 grams | 1 or 0 grams |

TABLE 10

|  |  | Elemental Phosphorus | | | Aqueous Phase | | | |
| --- | --- | --- | --- | --- | --- | --- | --- | --- |
|  |  | Initial | No I$_2$ Final | With I$_2$ Final | No I$_2$ Final | | With I$_2$ Final | |
| Na$_2$S$_2$O$_8$ | As | 180 ppm | 160 ppm | 37 ppm | <0.2 | ppm | 18 | ppm |
|  | Sb | 40 ppm | 13 ppm | 1.9 ppm | 6.2 | ppm | 11 | ppm |
| KSO$_5$ | As | 180 ppm | 170 ppm | 4.5 ppm | <0.2 | ppm | 25 | ppm |
| (oxone) | Sb | 40 ppm | <0.1 ppm | 2.9 ppm | 12 | ppm | 8.9 | ppm |
| NaOCl | As | 180 ppm | 150 ppm | 28 ppm | 1.0 | ppm | 15 | ppm |
|  | Sb | 40 ppm | <0.1 ppm | 0.5 ppm | 49 | ppm | <2 | ppm |

From the test results, the systems using the oxidant alone had little effect on lowering the arsenic level but did reduce the antimony. Those systems when tried with elemental iodine present showed significant reduction in the arsenic content of the phosphorus. Analysis of the aqueous phase showed the extraction of the arsenic and antimony into the aqueous phase.

Example 10

Calcium Iodate

| Charge: | 29.9 g. Phosphorus (containing 160 ppm As and 44 ppm Sb) |
| --- | --- |
|  | 0.40 g Ca(IO$_3$)$_2$ |
|  | 44.0 g 19% Hydrogen peroxide solution in water |
|  | 100 g Water |

Procedure: The phosphorus was charged to a 300 ml beaker containing the 100 grams of water. This mixture was heated to 60° C. in a water bath and stirred with a paddle stirrer. The calcium iodate and hydrogen peroxide were added and the complete mixture was stirred for three hours. After that time, the beaker contents were cooled to 20° C. in an ice bath, the aqueous phase was decanted off and the phosphorus was then washed with 150 grams of a 2% aqueous hydrogen peroxide solution at 60° C. for two hours.

The treated phosphorus contained 110 ppm arsenic and less than 0.5 ppm antimony.

Example 11

Calcium Iodate

| Charge: | 30.4 g. Phosphorus (containing 160 ppm As and 44 ppm Sb) |
| --- | --- |
|  | 2.30 g Ca(IO$_3$)$_2$ |
|  | 15.0 g 30% Hydrogen peroxide solution in water |
|  | 100 g Water |

Procedure: The phosphorus was charged to a 300 ml beaker containing the 100 grams of water. This mixture was heated to 60° C. in a water bath and stirred with a paddle stirrer. The calcium iodate and hydrogen peroxide were added and the complete mixture was stirred for three hours. After that time, the beaker contents were cooled to 20° C. in an ice bath, the aqueous phase was decanted off and the phosphorus was then washed with 150 grams of a 2% aqueous hydrogen peroxide solution at 60° C. for two hours.

The treated phosphorus contained 0.5 ppm arsenic and less than 0.5 ppm antimony.

Example 12

Iodic Acid

| Charge: | 30.06 g. Phosphorus (containing 160 ppm As and 44 ppm Sb) |
| --- | --- |
|  | 2.08 g HIO$_3$ |
|  | 10.0 g 30% Hydrogen peroxide Solution in Water |
|  | 150 g Water |

Procedure: The phosphorus was charged to a 300 ml beaker containing the 100 grams of water. This mixture was heated to 60° C. in a water bath and stirred with a paddle stirrer. The iodic acid and hydrogen peroxide were added and the complete mixture was stirred for three hours. After that time, the beaker contents were cooled to 20° C. in an ice bath, the aqueous phase was decanted off and the phosphorus was then washed with 150 grams of a 2% aqueous hydrogen peroxide solution at 60° C. for two hours.

The treated phosphorus contained 5.1 ppm arsenic and 1.7 ppm antimony.

Examples of Arsenic Removal from Phosphorus Using a Sealed Pressure Reactor

Apparatus: The apparatus used for the sealed pressure reactions of Examples 13–25 comprised a 500 ml three necked round bottom flask equipped with a stirrer and thermometer as shown on the attached FIG. 1. The entire reactor was suspended in a 70° C. water bath during the treatment period.

Example 13

The iodine source was potassium iodate used in an amount equivalent to 0.25 weight percent per weight of phosphorus. The charge to reactor was:

| 200 grams of water |
| --- |
| 30.62 grams of phosphorus |
| 0.13 grams of KIO$_3$ (0.075 grams of iodine) |
| 10 grams of a 30% H$_2$O$_2$ solution |

The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of H$_2$O$_2$. This mixture was stirred for two hours at 60° C. to remove traces of iodine in the phosphorus.

TABLE 11

|  | Grams | Arsenic ppm | Antimony ppm |
|---|---|---|---|
| Initial wt. of phosphorus | 30.26 | 124 | 42 |
| Final |  |  |  |
| Wt. of aqueous iodine/$H_2O_2$ phase | 254 | 5.3 | 6.0 |
| Wt. $H_2O_2$ wash | 221 | 1.6 | 0.05 |
| Wt. phosphorus | 29.1 | 62 | 0.10 |

Example 14

The iodine source was potassium iodate used in an amount equivalent to 0.5 weight percent per weight of phosphorus. The charge to the reactor was:

```
200   grams of water
30.62 grams of phosphorus
0.26  grams of KIO_3 (0.15 grams of iodine)
20    grams of a 30% HO_2 solution
```

The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 12

|  | Grams | Arsenic ppm | Antimony ppm |
|---|---|---|---|
| Initial weight of phosphorus | 30.26 | 124 | 42 |
| Final |  |  |  |
| Wt. of aqueous iodine/$H_2O_2$ phase | 254 | 12 | 6.0 |
| Wt. $H_2O_2$ wash | 221 | 1.3 | 005 |
| Wt. phosphorus | 30.3 | 34 | 0.23 |

Example 15

The iodine source was elemental iodine used in an amount of 0.5 weight percent of iodine per weight percent of phosphorus. The charge to the reactor was:

```
200   grams of water
31.46 grams of phosphorus
0.15  grams of iodine
20    grams of a 30% H_2O_2 solution
```

The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 13

|  | Grams | Arsenic ppm | Antimony ppm |
|---|---|---|---|
| Initial weight of phosphorus | 30.26 | 124 | 42 |
| Final |  |  |  |
| Wt. of aqueous iodine/$H_2O_2$ phase | 254 | 12 | 5.7 |
| Wt. $H_2O_2$ wash | 221 | 0.84 | 0.05 |
| Wt. phosphorus | 30.1 | 28 | 0.27 |

Example 16

The iodine source was calcium iodate used in an amount equivalent to 0.5 weight percent per weight percent of phosphorus. The charge to the reactor was:

```
200   grams of water
30.94 grams of phosphorus
0.26  grams of Ca(IO_3)_2 (0.15 grams of iodine)
20    grams of a 30% H_2O_2 solution
```

The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 14

|  | Grams | Arsenic ppm | Antimony ppm |
|---|---|---|---|
| Initial weight of phosphorus | 3094 | 124 | 42 |
| Final |  |  |  |
| Wt. of aqueous iodine/$H_2O_2$ phase | 215 | 11 | 6.2 |
| Wt. $H_2O_2$ wash | 221 | 1.3 | 0.05 |
| Wt. phosphorus | 31.3 | 27 | 0.05 |

Example 17

The iodine source was iodic acid used in an amount equivalent to 0.5 weight percent based on the weight of phosphorus. The charge to the reactor was:

```
200   grams of water
30.12 grams of phosphorus
0.21  grams of HIO_3 (0.15 grams of iodine)
20    grams of a 30% H_2O_2 solution
```

The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 15

|  | Grams | Arsenic ppm | Antimony ppm |
|---|---|---|---|
| Initial weight of phosphorus | 30.12 | 124 | 42 |
| Final |  |  |  |
| Wt. of aqueous iodine/$H_2O_2$ phase | 248 | 13 | 5.6 |
| Wt. $H_2O_2$ wash | 221 | 1.1 | 0.05 |
| Wt. phosphorus | 30.8 | 7 | 0.10 |

Example 18

The iodine source was iodine used in an amount of 1 weight percent based on the weight of phosphorus. The charge to the reactor was:

130 grams of water
30.27 grams of phosphorus
0.30 grams of $I_2$ (0.30 grams of iodine)
13 grams of a 30% $H_2O_2$ solution The above mixture was charged to the 500 ml flask in the order listed. The reactor was sealed by putting stoppers in the open necks of the flasks and the unit was submerged completely in a 60° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 16

|  | Grams | Arsenic ppm | Antimony ppm |
|---|---|---|---|
| Initial weight of phosphorus | 30.27 | 124 | 42 |
| Final |  |  |  |
| Wt. of aqueous iodine/$H_2O_2$ phase | 120 | 28 | 11 |
| Wt. $H_2O_2$ wash | 200 | 1.3 | 0.05 |
| Wt. phosphorus | 30.8 | 3.5 | 0.05 |

Example 19

The iodine source was iodine used in an amount of 1 weight percent based on the weight of phosphorus. The charge to the reactor was:

200 grams of water
30.34 grams of phosphorus
0.50 grams of $KIO_3$ (0.3 grams of iodine)
10 grams of a 30% $H_2O_2$ solution The above mixture was charged to the 500 ml flask in the order listed. The reactor was sealed by putting stoppers in the open necks of the flasks and the unit was submerged completely in a 60° C. water tank. The phosphorus was allowed to melt and then the mixture was stirred for three hours at 60° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 17

|  | Grams | Arsenic ppm | Antimony ppm |
|---|---|---|---|
| Initial weight of phosphorus | 30.34 | 124 | 42 |
| Final |  |  |  |
| Wt. of aqueous iodine/$H_2O_2$ phase | 248 | 13.8 | 5.1 |
| Wt. $H_2O_2$ wash | 221 | 1.2 | 0.05 |
| Wt. phosphorus | 30.8 | 1.2 | 0.05 |

Example 20

The iodine source was iodine used in an amount of 1 weight percent based on the weight of phosphorus. The charge to the reactor was:

150 grams of water
31.2 grams of phosphorus
0.3 grams of iodine
15 grams of a 30% $H_2O_2$ solution The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 70° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 18

|  | Grams | Arsenic ppm | Antimony ppm |
|---|---|---|---|
| Initial weight of phosphorus | 31.2 | 124 | 42 |
| Final |  |  |  |
| Wt. of aqueous iodine/$H_2O_2$ phase | 160 | 23 | 7.9 |
| Wt. $H_2O_2$ wash | 150 | 1.1 | 0.05 |
| Wt. phosphorus | 30.9 | 2.2 | 0.10 |

Example 21

The iodine source was potassium iodate used in an amount equivalent to 1 weight percent iodine based on the weight of phosphorus. The charge to the reactor was:

200 grams of water
30.9 grams of phosphorus
0.51 grams of $KIO_3$ (0.3 grams of iodine)
13.3 grams of a 30% $H_2O_2$ solution The above mixture was charged to the 500 ml flask in the order listed. The reactor was sealed by putting stoppers in the open necks of the flasks and the unit was submerged completely in a 70° C. water tank. The phosphorus was allowed to melt and then the mixture was stirred for three hours at 70° C. The mixing was stopped after three hours and the reactor contents cooled to 20° C. The aqueous phase was removed and replaced with 200 grams of water containing six grams of $H_2O_2$. This mixture was stirred for two hours at 60° C. to remove traces of iodine in the phosphorus.

TABLE 19

|  | Grams | Arsenic ppm | Antimony ppm |
|---|---|---|---|
| Initial weight of phosphorus | 30.9 | 124 | 42 |
| Final |  |  |  |
| Wt. of aqueous iodine/$H_2O_2$ phase | 223 | 17 | 5.6 |
| Wt. $H_2O_2$ wash | 215 | 1.1 | 0.05 |
| Wt. phosphorus | 30.8 | 4.4 | 0.10 |

Examples 22–25

Using the closed flask reactor procedure described for examples 13–21, a phosphorus containing 148 ppm arsenic was treated with iodine (example 22), potassium iodate (example 23), iodic acid (example 24) and calcium iodate (example 25). The initial charge of phosphorus, amount of iodine (or iodate) and the amount of 30% hydrogen peroxide and the resulting arsenic contained in the treated phosphorus are given below in Table 19.

TABLE 20

| Iodine Source | Sample | $P_4$ gm | Iodine gm | $H_2O_2$ gm | As ppm | % $I_2$ per $P_4$ |
|---|---|---|---|---|---|---|
| Iodine | 22-1 | 31.41 | 0.15 | 6 | 28 | 0.5 |
|  | 22-2 | 31.21 | 0.30 | 4.5 | 2.2 | 1 |
|  | 22-3 | 30.27 | 0.30 | 4.5 | 3.5 | 1 |
| $KIO_3$ | 23-1 | 30.26 | 0.13 | 3 | 62 | 0.23 |
|  | 23-2 | 30.62 | 0.26 | 6 | 34 | 0.5 |
|  | 23-3 | 30.92 | 0.51 | 4 | 4.4 | 1 |
|  | 23-4 | 32.21 | 0.50 | 4.5 | 5.7 | 1 |
|  | 23-5 | 30.34 | 0.50 | 3 | 1.2 | 1 |
| $HIO_3$ | 24 | 30.12 | 0.21 | 3 | 6.9 | 0.5 |
| $Ca(IO_3)_2$ | 25 | 30.94 | 0.23 | 3 | 27 | 0.5 |

What is claimed is:

1. A process for reducing the arsenic content of elemental phosphorus comprising arsenic, the process comprising:
   contacting the elemental phosphorous with an oxidant and with an oxidized form of iodine;
   in which:
      the contacting is carried out at a temperature at which the elemental phosphorous is in the liquid state; and
      the contacting is carried out in a manner that prevents the elemental phosphorous from coming in contact with oxygen.

2. The process of claim 1 which the oxidized form of iodine is an iodate, iodic acid or a mixture thereof.

3. The process of claim 1 or claim 2 in which the oxidized form of iodine is about 0.1–7 weight percent iodine based on the weight of the elemental phosphorus, and the oxidant is a peroxy compound.

4. The process of claim 3 wherein the process is conducted in a reactor system opened to the atmosphere.

5. The process of claim 4 in which the oxidized form of iodine is about 1–7 weight percent iodine based on the weight of elemental phosphorus.

6. The process of claim 5 in which the oxidant is selected from the group consisting of hydrogen peroxide, peroxydisulfate salts, caro's acid, peroxymonosulfate salts, hypochlorous acid, salts of hypochlorous acid, sodium hypochlorite and mixtures thereof.

7. The process of claim 6 in which the elemental phosphorus additionally comprises antimony and in which sufficient oxidant is used to reduce the amount of antimony in the elemental phosphorus.

8. The process of claim 7 wherein the temperature is about 45–95° C., and the oxidant does not exceed about 10 weight percent as active oxygen based on the weight of the phosphorus.

9. The process of claim 8 wherein the amount of the oxidized form of iodine does not exceed about 5 wt/wt percent and the temperature of the process is about 50–70° C.

10. The process of claim 9 wherein the amount of the oxidized form of iodine does not exceed about 3 wt/wt percent.

11. The process of claim 3 wherein the process is conducted in a reactor system closed to the atmosphere.

12. The process of claim 11 wherein the iodic acid, iodate salt or mixture thereof is used in an amount equivalent to about 0.1–1 weight percent iodine based on the weight of elemental phosphorus.

13. The process of claim 12 in which the oxidant is selected from the group consisting of hydrogen peroxide, peroxydisulfate salts, Caro's acid, peroxymonosulfate salts, hypochlorous acid, salts of hypochlorous acid, sodium hypochlorite and mixtures thereof.

14. The process of claim 13 wherein the elemental phosphorus comprises antimony, and sufficient oxidant is used to reduce the amount on antimony in the elemental phosphorus.

15. The process of claim 14 wherein the oxidant does not exceed about 10 weight percent as active oxygen based on the weight of phosphorus.

16. The process of claim 14 wherein the temperature of the process is about 60–80° C.

17. The process of claim 6 additionally comprising, after the contacting step, the step of washing the elemental phosphorus with a dilute oxidant solution.

18. The process of claim 13 additionally comprising, after the contacting step, the step of washing the elemental phosphorus with a dilute oxidant solution.

19. The process of claim 7 wherein the oxidant is hydrogen peroxide.

20. The process of claim 14 wherein the oxidant is hydrogen peroxide.

21. The process of claim 1 or claim 2 in which the oxidant and the oxidized form of iodine are in an aqueous phase.

22. The process of claim 12 in which the oxidant and the oxidized form of iodine are in an aqueous phase.

23. The process of claim 14 in which the oxidant and the oxidized form of iodine are in an aqueous phase, in which the amount of arsenic in the elemental phosphorous is reduced to less than about 1 ppm, and in which the amount of antimony in the elemental phosphorus is reduced to less than about 1 ppm.

24. The process of claim 1 or claim 2 in which the oxidized form of iodine is formed by reaction of iodine with the oxidant.

25. The process of claim 22 in which the oxidant and the oxidized form of iodine are in an aqueous phase.

26. The process of claim 25 additionally comprising, after the contacting step, washing the elemental phosphorus with a dilute oxidant solution.

27. The process of claim 26 in which the oxidized form of iodine is formed by reaction of iodine with the oxidant.

28. A process for reducing the arsenic content of elemental phosphorus containing arsenic comprising in a closed reactor system     contacting the elemental phosphorus with an oxidized form of iodine in an amount equivalent to about 0.1–1 weight percent iodine based on the weight of elemental phosphorus and     contacting the elemental phosphorus with a peroxy compound in an amount of about 0.05–2.4 weight percent based on active oxygen wherein the temperature of the process results in the phosphorus being in a liquid state and wherein the contacting is conducted in a manner which prevents the phosphorus from coming into contact with oxygen.

\* \* \* \* \*

UNITED STATES PATENT AND TRADEMARK OFFICE
CERTIFICATE OF CORRECTION

PATENT NO. : 6,146,610
DATED : November 14, 2000
INVENTOR(S) : Louis T. Gunkel

It is certified that error appears in the above-identified patent and that said Letters Patent are hereby corrected as shown below:

Column 1, line 55, the terms, "HEI5(1993)43,210" should be replaced with the term, "HEI5(1993)-43,210".

Column 6, line 9, the word "Man" should be replaced with the word, "than".

Column 15, line 23, the chemical formula "HO2" should be replaced with, "H2O2".

Column 20, line 1, the word "caro" should be replaced with, "Caro".

Signed and Sealed this

Twenty-ninth Day of May, 2001

Attest:

NICHOLAS P. GODICI

Attesting Officer

Acting Director of the United States Patent and Trademark Office